Nov. 13, 1945.
A. BLAIN
2,389,021
RECORDING APPARATUS
Filed June 30, 1943
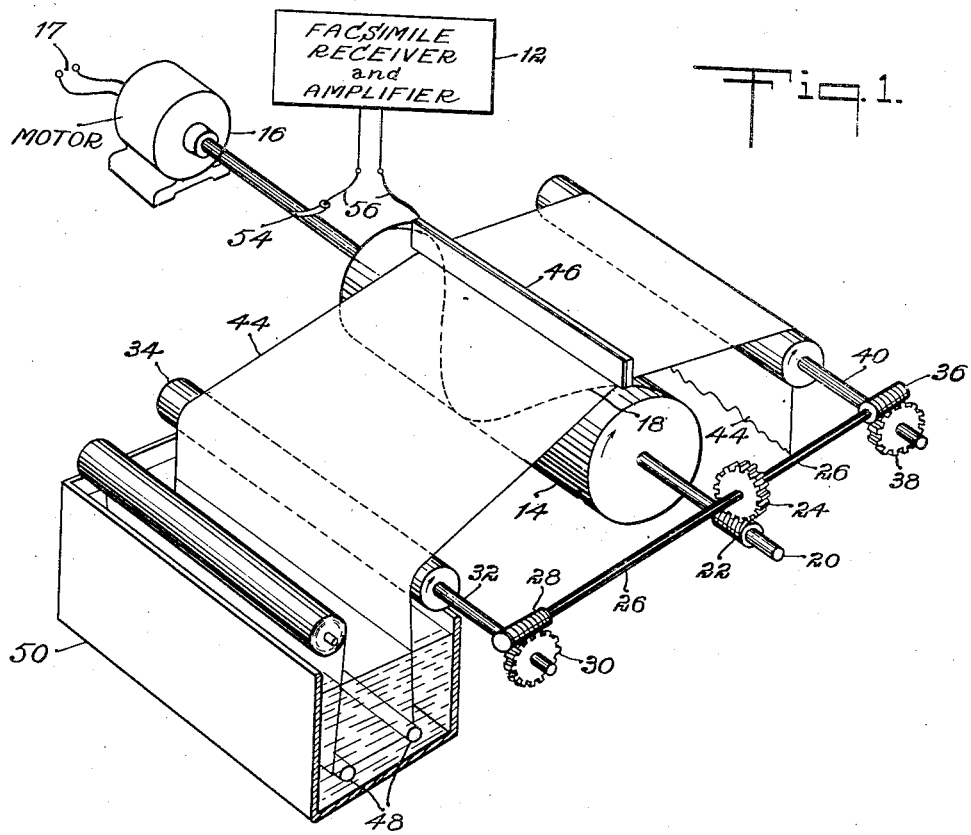
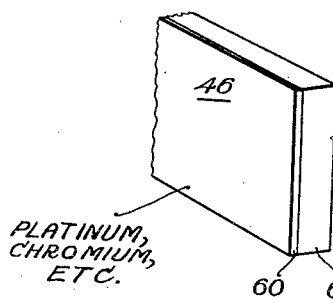
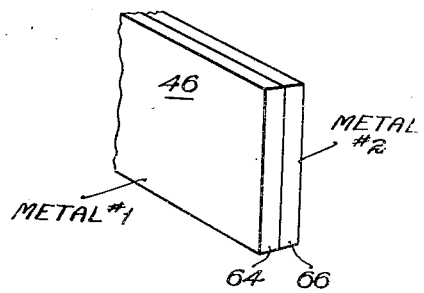
INVENTOR.
Albert Blain
by H. G. Grover
ATTORNEY.

Patented Nov. 13, 1945

2,389,021

UNITED STATES PATENT OFFICE 2,389,021

RECORDING APPARATUS

Albert Blain, Philadelphia, Pa., assignor to Radio Corporation of America, a corporation of Delaware Application June 30, 1943, Serial No. 492,837

7 Claims. (Cl. 234—59)

This invention relates to an improvement in facsimile apparatus, and more particularly to an improvement in electrolytic facsimile receiving equipment.

A facsimile system includes a facsimile scanning apparatus for converting the subject matter to be transmitted into a series of electrical signals or impulses which, after appropriate amplification, may then be transmitted by wire to a receiving apparatus, or the amplified signals may be used to modulate a carrier oscillation, the carrier oscillation being, in turn, transmitted by wire or radio communication channel to the receiving apparatus. At the receiving station the received signals are then used to produce markings on a sheet of record-receiving material or paper which will herein be considered synonymous for illustrative purposes. When the transmitter and receiver are operated in synchronism with each other, these markings are effective to reproduce the original subject matter.

Various types of facsimile receiving apparatus are well known to those skilled in the art, one of these types being the electrolytic recorder in which the recording is produced by the formation of a color in or on the surface of a sheet of chemically treated record-receiving material or paper, the color being formed due to a chemical reaction in response to the application of a potential to the paper, or the transmission of current therethrough. For producing the recordings in this manner, the material or paper is previously impregnated with a chemical solution which, when subjected to an electrical current or potential, while in a moist condition, will produce the desired markings.

It is conventional practice to apply the received and amplified facsimile signals to the chemically treated paper by means of a pair of electrodes placed on opposite sides of the paper so that when the signals are impressed upon the electrodes, proportional currents flow through the paper and form a colored marking in accordance with the intensity of the potential. Various chemical solutions may be used to produce various results and to produce differently colored markings.

When some solutions are used, the metal of which the electrode is made enters into the chemical reaction, whereas in other instances, the metal of the electrode is inert insofar as the chemical reaction is concerned. The metal used in the electrode is, therefore, chosen in accordance with the desired color, and in accordance with the particular chemical used as an electrolyte for impregnating the paper. It has been found also that some metals produce substantially no markings, even when a relatively high current flows through the paper.

Since the markings are produced in an electrolytic facsimile receiver in response to current variations, the pressure of the printer bar upon the paper may be maintained substantially uniform, and inasmuch as some physical pressure is necessary to produce good electrical contact with the moist impregnated paper, it is desirable that the printer bar have some appreciable thickness in order not to cut or otherwise physically injure the paper. The cooperating electrode must also have some appreciable thickness or width, and in most conventional facsimile printers the cooperating electrode is in the form of a helix or spiral which is wound around the periphery of a rotatable drum. As the recording drum and helix are rotated relative to the stationary printer bar (with the paper interposed therebetween) a scanning action is produced, and the size of the scanning spot is determined by the contacting area of the helix and printer bar, and thus can be considered as determined by the thickness or dimensions of the printer bar and the cooperating helix. Since these have appreciable thickness, it is possible in some instances for the size of the scanning spot to be excessively large so that high detail in the produced facsimile recording cannot be achieved.

By means of the present invention, the effective size of the scanning spot, i. e., the effective size of the intersection of the printer bar and rotating helix, may be materially reduced.

When certain chemical solutions are used, it has been found that best recordings can be made if the printer bar is made of platinum. Accordingly, if the printer bar is made of sufficient thickness to have the desired mechanical strength and to avoid mechanical damage to the paper, the cost of the printer bar may be appreciable, and in some instances platinum in such amounts is frequently difficult to obtain. According to the present invention, the cost of the printer bar is reduced to a small fraction of the original cost, particularly when the active printing metal is platinum, while at the same time the operational results are improved. This is accomplished by laminating the printer bar and constructing it of two different metals, one of which is ineffective to produce a recording or a dye, while the other of which may be effective in the production of a recording. By so laminating the printer bar, the effective size of the scanning spot may be materially reduced, and in cases where the printing metal is platinum, the cost of the printer bar is substantially reduced.

Accordingly, one purpose of the present invention is to provide a new and improved facsimile recorder in which the printing bar is made of laminated metals, one of which is a non-printing metal (i. e., ineffective toward forming a marking), and the other of which is a printing metal (i. e., produces a marking).

Another purpose of the present invention resides in the provision of a laminated printer bar in a facsimile reproducer by means of which the scanning spot can be made extremely small, with the result that the scanning line can be made extremely thin, thus permitting the use of a larger number of lines per inch, resulting in a considerable increase in the amount of detail that may be included in the facsimile reproduction.

A still further purpose of the present invention resides in the use of a laminated printer bar in a facsimile printer whereby the cost of the printer bar may be appreciably reduced.

Still another purpose of the present invention resides in the provision of a laminated printer bar in a facsimile receiver in which one or more of the metals of the laminated bar may be effective to simultaneously produce recordings in different colors so that the combined color will produce a predetermined desired effect or result.

Various other purposes and advantages of the present invention will become apparent to those skilled in the art from the following detailed description, especially when considered in connection with the drawing, wherein Figure 1 shows a portion of a facsimile receiver or printer incorporating the present invention;

Figure 2 shows enlarged details of the printer bar used in Figure 1; and

Figure 3 shows a modification of the printer bar.

Referring now to Figure 1, a facsimile receiver 12 is schematically represented, and this apparatus includes not only the receiver but also a demodulator or detector (in case the signals are transmitted by a modulated carrier) and a facsimile signal amplifier for increasing the intensity of the received signals to a value such that they may be directly applied to the recording electrodes of the recorder or printer. The facsimile recorder includes a printing drum 14 which is rotated, by means of a motor 16, at proper synchronous speed with respect to the scanning means at the transmitter. The motor terminals 17 may be connected to a conventional power line with some appropriate means for maintaining proper synchronous operation with the transmitter, or the motor may be operated from appropriately provided apparatus in the facsimile receiver 12. Since the present invention is not concerned with synchronizing, this portion of the system has not been specifically shown, and various synchronizing and speed control means for facsimile receivers are well known to those skilled in the art.

The printing drum 14 includes a helix 18 which is wound about the periphery of the drum, the helix generally being in the form of a wire embedded in a helical recess. This helix forms one electrode of the pair of recording electrodes.

The facsimile printer also includes a record-receiving paper feed roller 34 together with a traction roller 42, and the speed of rotation of at least the feed roller 34 is controlled in accordance with the scanning speed at the transmitter which bears a definite relationship to the rotation speed of the scanning drum 14. In order that the feed roller 34 may be rotated at a predetermined speed with respect to the speed of rotation of the scanning drum, a mechanical gearing arrangement is generally provided for interconnecting the two elements, and for this purpose a worm 22 is attached to the shaft 20, and these elements are rotated by the printing drum 14. The worm 22 cooperates with a gear 24 which rotates at a reduced speed, and the gear 24, in turn, rotates the countershaft 26. One end of the countershaft 26 is provided with a worm 28 which engages gear 30 for rotating the driving drum 34 by means of the shaft 32. The traction roller 42 is also rotated at a speed proportional to the speed of the printing drum 14 by means of a worm 36 positioned on the countershaft 26. The worm cooperates with gear 38, which is attached to shaft 40 for rotating the traction drum 42. The peripheral speed of drum 42 may be slightly in excess of the rate at which the paper is fed through the printer to assure constant tension on the paper, and in this event the drum 42 is permitted to slip relative to the paper.

The paper 44 is normally positioned between the printer bar 46 and the printing drum 14, and is held in frictional engagement with the feed roller 34 and the traction roller 42 by means of pressure rollers (not shown). The paper is obtained from a supply roll 52 and as the paper moves forward through the recording apparatus, it passes through an electrolyte bath contained in tank 50. The paper is maintained submerged in the electrolyte during its passage through the tank by means of idler rollers 40. The paper in passing through the electrolyte tank is impregnated with the chemical solution contained therein, and is in a moist condition at the time it reaches the recording electrodes. The moisture contained in the paper facilitates the passage of current therethrough, and the chemicals contained in the electrolyte and absorbed by the paper are instrumental in forming the dye markings on the surface of the paper or within the paper when an electrical current is passed through the paper as it passes between the electrodes.

So far as the present invention is concerned, the specific construction of the recording mechanism is more or less immaterial, and it may, for example, be constructed in accordance with the disclosure of Blain application Serial No. 460,615, filed on October 3, 1942, or Artzt application Serial No. 459,137, filed September 21, 1942. Any desired electrolyte may be used for impregnating the paper, and solutions such as those referred to in Solomon Patent No. 2,306,471, issued December 29, 1942, for example, may be used. Other examples of usable recording electrolytes are disclosed in Solomon applications Serial No. 463,218, filed October 24, 1942, Serial No. 469,959, filed December 23, 1942, Serial No. 469,960, filed December 23, 1942, Serial No. 469,961, filed December 23, 1942, Serial No. 469,958, filed December 23, 1942, Serial No. 469,957, filed December 23, 1942, and Serial No. 469,962, filed December 23, 1942.

In the present invention the printer bar 46 is of laminated construction, and comprises two or more different materials or metallic alloys. It has been found that for most electrolytes used in electrolytic facsimile recording, copper or copper alloys do not produce any appreciable markings and are not particularly effective towards the formation of a dye. Platinum, on the other hand, will readily produce a dye formation which is generally of a purple color, but may be of different colors depending upon the different electrolytes used. For this reason it has been conventional to construct the printer bar of solid platinum having a thickness of about 0.01 inch, such a thickness being necessary to supply the required mechanical rigidity and strength. Iridium platinum is frequently used because of the added hardness iridium imparts to the platinum resulting in longer life of the printer bar. When a printer bar is made solely of platinum, it is relatively expensive, and, furthermore, the entire edge surface of the printer bar is effective in producing electrolytic markings.

In the present invention, the printer bar may, in one modification as shown in Figure 2, be laminated and composed of two pieces of metal 60 and 62, the latter being beryllium copper, for example, or a copper alloy, and having a thickness of approximately 0.01 inch with a thin layer 60 of platinum, chromium or some other appropriate recording metal plated or otherwise deposited thereon. This thin layer of platinum or printing metal 60 may have a thickness of the order of 0.0002 inch, or a small fraction of a mil.

Inasmuch as the beryllium copper or the portion 62 of the printer bar is ineffective toward the production of facsimile markings, the effective instantaneous recording area (or scanning spot) is materially reduced since only the thin coating 60 is effective toward producing facsimile markings on the paper. Since only the thin coating 60 will produce facsimile markings, the width of the scanning line can be made extremely thin. With the result that the number of scanning lines per inch can be increased in number, and accordingly much greater detail can be reproduced in the facsimile reproduction produced by the recorder. In addition to increasing the amount of detail in the recordings, the cost of the printer bar is materially reduced.

Where a laminated printer bar constituting two metals is used, it is preferable to locate the printing metal on the paper approach side of the bar. This, however, is not vital since a printer bar may be constructed with the active or recording metal located between two adjacent strips of non-recording metals.

In Figure 3 is shown another modification of a printer bar in which two metals 64 and 66 are used, and are positioned adjacent each other in a laminated manner to form a composite printing bar. The choice of the particular metals is dependent, of course, upon the particular electrolyte used and the desired color combinations. Metal No. 1, for example, might be a chromium plating or deposit on metal No. 2, which, for example, might be iron, so that the final result will produce a combination of green as a result of the presence of the iron portion of the printer bar, and purple from the presence of the chromium portion 64. With such a construction it is, therefore, possible to produce markings of a color heretofore unobtainable by an actual combination of two different colors through proper choice of metals used in the laminated printer bar, together with a proper choice of the particular electrolyte used.

In constructing printer bars by lamination of two or more metals, it is desirable to choose metals such that their erosion (both chemical and mechanical) will be substantially equal in order that the different metals of which the printer bar is made will erode at about the same rate; otherwise an undesired effect might result if one metal were to wear down by mechanical erosion or were to be used up due to chemical reaction more rapidly than the other. If an electrolyte is used, however, which requires a reaction with one of the metals of which the laminated printer bar is constructed, proper choice of the other metal is not too critical since mechanical erosion or wear of the one metal will tend to compensate for the chemical erosion of the other.

The polarity of the recording potentials as applied to the printer bar is determined in accordance with the particular electrolyte used. However, in most cases the positive potential is applied to the recording drum 14 or helix 18. For this purpose, a brush 54 may be provided, which cooperates electrically with the helix 18, and two conductors 56 connect the printer bar 46 and brush 54 to the facsimile receiver and amplifier 12. In actual practice the helix 18 and drum 14 are in electrical contact with the entire apparatus so that one conductor from the amplifier may be connected to the metallic frame of the recorder. The other conductor is connected to the printer bar 46 which is electrically insulated from the recorder mechanism.

Various alterations and modifications may be made in the present invention without departing from the spirit and scope thereof, and it is desired that any and all such alterations and modifications be considered within the purview of this invention.

Having now described my invention, what I claim as new and desire to have protected by Letters Patent is:

1. A facsimile printing apparatus including a pair of recording electrodes, one of said electrodes including a plurality of conducting laminae positioned adjacent each other, the face of each lamina cooperating with the other recording electrode, means for positioning the recording electrodes so that a strip of record-receiving material may be positioned therebetween, and means for applying signal potentials to the recording electrodes.

2. An electrolytic facsimile recording apparatus including a pair of recording electrodes between which a strip of record-receiving paper is adapted to be passed, one of said electrodes including metallurgically different electrically conducting metallic laminae positioned closely adjacent each other and positioned so that the face of each lamina cooperates with the other electrode, and means for applying facsimile signals to the recording electrodes.

3. An electrolytic facsimile recording apparatus wherein a recording is produced on a strip of chemically impregnated record-receiving paper as a result of passing an electrical current through the paper, comprising a pair of recording electrodes, having cooperating faces, the face of one of said electrodes being constituted of different laminated elements having dissimilar metallurgical characteristics at least one of which elements is electrically conducting and effective to produce the desired markings on the paper, and means for applying facsimile signals to the recording electrodes.

4. A printing bar for use in an electrolytic recording apparatus for producing markings on a chemically impregnated record-receiving material comprising a plurality of electrically conducting metallic elements having different metallurgical properties, said elements being arranged in laminated form, one of said elements being capable of producing chemical reactions to cause facsimile markings and the other elements being substantially incapable of producing chemical reactions to cause facsimile markings on the record-receiving material, the metallic elements being co-extensive along one edge of the printing bar.

5. A laminated printing bar for use in an electrolytic recording apparatus for producing markings on a chemically impregnated record-receiving material comprising a plurality of flat co-extensive laminations of different electrically conducting metallic alloys having different metallurgical properties, each of said metals being capable of producing different facsimile markings on the record-receiving material.

6. An electrolytic facsimile receiver wherein markings are produced on a chemically impregnated record-receiving material when an electrical current is passed through the impregnated material as a result of chemical reaction of the impregnating chemicals and one of the recording electrodes, comprising a pair of recording electrodes, means for applying facsimile signals to the recording electrodes, and means for positioning the electrodes such that impregnated material may be passed therebetween, one of said electrodes including a plurality of laminated electrically conducting metallic elements having dissimilar metallurgical characteristics, at least one of which elements reacts with the impregnating chemicals to produce the markings, the said one electrode being positioned so that an edge of each lamination is in contact with the record-receiving material.

7. An electrolytic facsimile recorder wherein facsimile recordings are produced on a chemically impregnated record-receiving material when the material is subjected to an electrical potential between a pair of electrodes as a result of chemical reaction between one of the electrodes and the chemicals with which the material is impregnated, comprising a pair of electrodes, means for applying facsimile signals to the recording electrodes, means for positioning the electrodes such that the impregnated material may be passed therebetween, one of said electrodes including two different electrically conducting metals having different metallurgical characteristics, each of which reacts with the impregnating chemicals to produce markings, said metals being positioned in close contact with each other and in equal proximity to the other electrode and arranged to form a composite laminated printing electrode.

ALBERT BLAIN.